May 29, 1923.

U. S. G. WELSH 1,457,240

DISHWASHING MACHINE

Filed May 15, 1920

WITNESSES

INVENTOR
ULYSSES S. G. WELSH
BY
ATTORNEYS

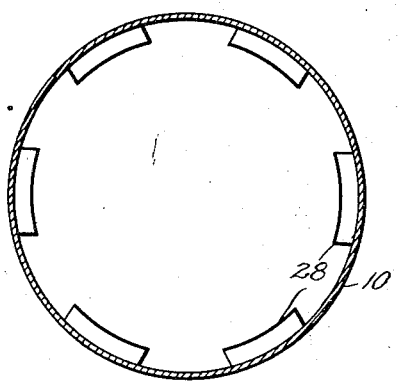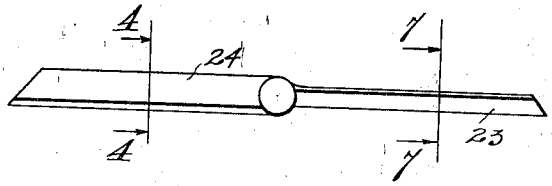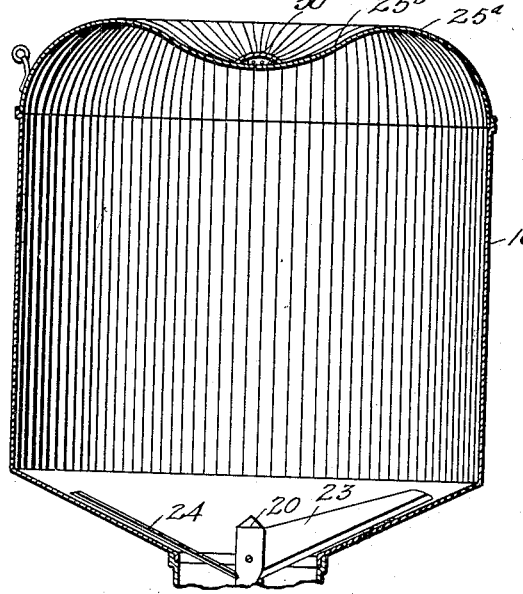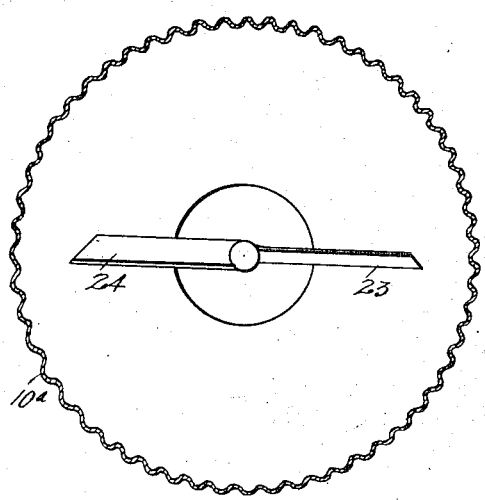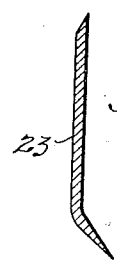

Patented May 29, 1923.

1,457,240

UNITED STATES PATENT OFFICE.

ULYSSES S. G. WELSH, OF BROOKLYN, NEW YORK.

DISHWASHING MACHINE.

Application filed May 15, 1920. Serial No. 381,779.

*To all whom it may concern:*

Be it known that I, ULYSSES S. G. WELSH, a citizen of the United States, and a resident of the city of New York, borough of Brooklyn, in the county of Kings and State of New York, have invented a new and Improved Dishwashing Machine, of which the following is a description.

My invention relates to a dish washing machine and more particularly to a machine in which agitating means for the washing water is employed.

The invention resides in the novel means for directing the water effectively onto the dishes in the receptacle of the machine and in the novel form of the water-agitating means.

The distinctive features of the invention as well as the advantages can best be stated in connection with a specific description of practical embodiments of the invention as given hereinafter.

Reference is to be had to the accompanying drawings forming a part of this specification, it being understood that the drawings are merely illustrative of examples of the invention.

Figure 2 is a reduced sectional plan view, the section being taken in a plane corresponding with the line 2—2, Figure 1;

Figure 3 is a plan view of the agitating blade;

Figure 4 is a cross section of said blade on the line 4—4, Figure 3;

Figure 5 is a vertical section of the upper portion of the machine showing the receptacle and its cover in modified form;

Figure 6 is a horizontal section of the receptacle shown in Figure 5;

Figure 7 is a cross section through the agitating blade on the line 7—7, Figure 3.

Figure 1:
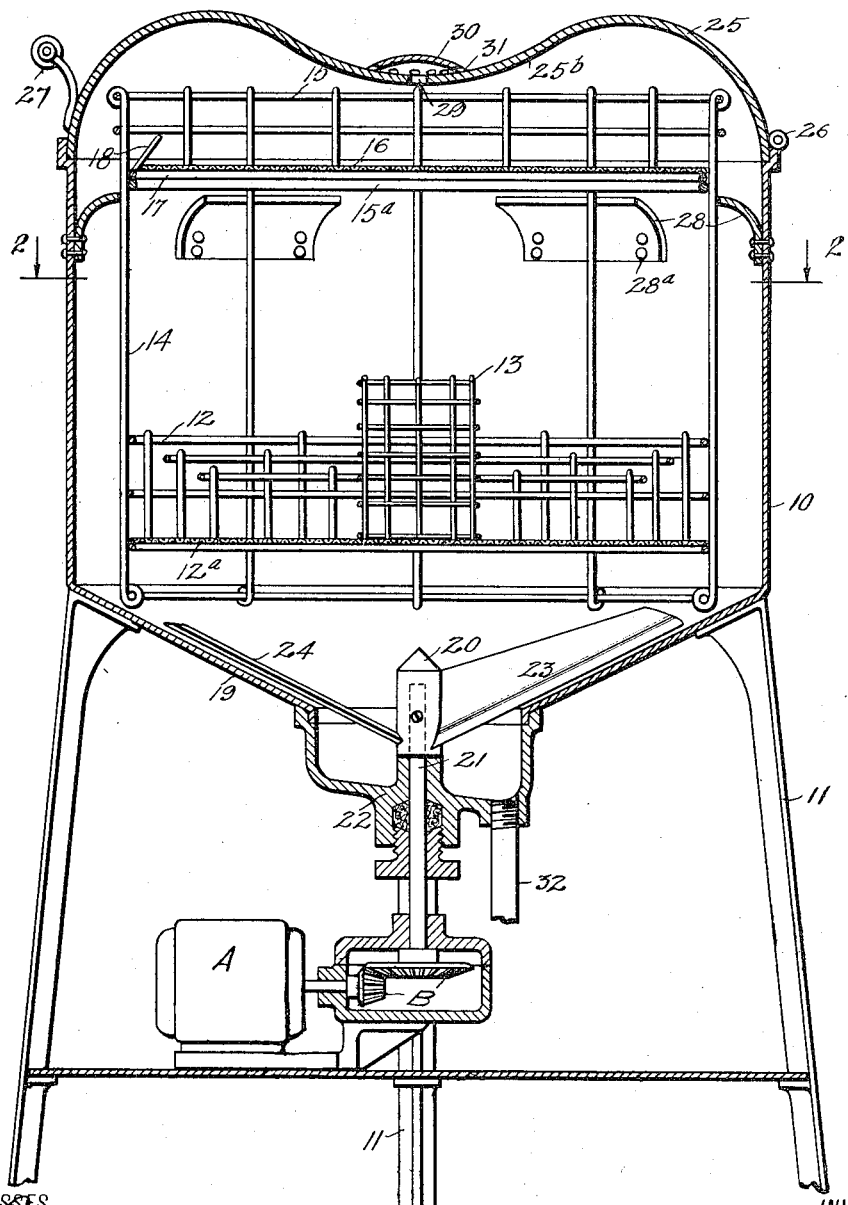
Figure 1 is a vertical section of a dish washing machine embodying my invention.

In carrying out my invention in practice, a water-tight container or receptacle 10 is provided, here shown as having supporting legs 11. Within the container is any suitable basket 12 for the dishes which may have a central separate receptacle 13 for flatware and the like. The basket is made of wire or equivalent open work with a mesh or equivalent bottom 12ª and on standards 14 thereof rising to near the top of the receptacle 10 a frame 15 is provided to sustain a tray 16, of wire mesh or equivalent material presenting openings, for glasses, cups, or the like. The tray 16 is indicated as having an annular wire frame 17 resting on a fixed ring 15ª of frame 15 and provided with a suitable element 18 to constitute a handle. The bottom 19 flares upwardly and the basket 12 with its supported frame and tray as described, rests on said bottom.

An agitating element 20 is arranged to revolve in the container 10 adjacent to the bottom 19 between the same and the bottom of the basket 12. Said agitating element is secured in any suitable manner to a vertical shaft 21 turning in a bearing 22 depending beneath the bottom 19, the shaft being adapted to be driven by any suitable means, such as an electric motor conventionally indicated at A through gearing B. The element 20 presents an agitating blade 23 at an angle approximately that of bottom 19 to extend adjacent thereto, the function of said blade being to agitate the water and throw it upwardly through the bottom of the basket 12 and against the dishes therein, as well as to direct the water to the sides of the container 10 as further referred to hereinafter. In order to prevent the blade overbalancing the agitating element and wearing down the bearing surfaces in a manner to result in loose play and consequent undesirable rattling in the operation of the machine, I provide on said agitating element 20 a balancing blade 24 diametrically opposite to the blade 23 or approximately so and of a character to cut through the water without material agitation and with minimum resistance; for the purpose said blade advantageously has approximately a cross section as shown in Figure 4, the blade tapering toward its forward edge and thickened toward the rear edge, or given equivalent formation to incorporate a sufficient mass therein for the functioning of said blade as a balance to the agitating blade 23.

By providing the counterbalancing member in the form of a blade, not only is it non-agitating, but it will readily be understood that the oblique upper surface of said blade subjects it to the weight of the water as the blade advances, thereby the water reacts to exert a downward pressure on the blade and its bearing which prevents it from rumbling and rattling; it being well known that in machines of this character the agitating blade produces a distinctly annoying rattle when operated.

The action of blade 23 in directing the water to the vertical sides of the container 10 results in the water acquiring momentum under centrifugal force, causing the water to rise along the sides of the container, and in order that the force thus expended in causing the water to rise along the sides of the container may be utilized for the effective spraying of the dishes in the basket 12 and tray 16, I provide means to cause the upwardly moving water to be directed laterally inward in a manner to fall upon the dishes, for which purpose I provide deflecting means advantageously embodied in the cover 25 thereof as in the preferred form of my invention. Said cover 25 is here shown as hinged at one side as at 26 to the top of the body 10 and provided with a handle 27 at the opposite side. The cover is made to present an upwardly and inwardly rounding surface at its outer portion, the rounding surface merging into a downwardly disposed central convexity 25$^b$ produced by depressing said cover at the center. The arrangement is such that the water rising along the sides of the receptacle 10 will be curved laterally inward over the dish-containing basket and distributed over the dishes therein. In order to provide for directing water laterally inward in a plane below the top of the container to insure the thorough washing of all areas of all the dishes, the container 10 may as shown be provided below the top thereof with curved deflecting elements 28 spaced in an annular series about the interior of the container and secured at their lower edges to said container by rivets 28$^a$ or other means, and curving over laterally inward beneath the tray 16. Thus, a portion of the water rising along the sides of the container 10 will be intercepted by the blades 28 and curved over onto the dishes in the body of the basket 12 while other portions of water between said deflecting elements will continue upwardly to the top 25 to be curved over onto the tray and basket.

The downward curvature of the deflecting surface 25$^b$ continuous with the incurving surface produces the important result that the water is deflected downwardly before its momentum is expended, and thereby the water is positively directed downwardly on to the articles in the receiver with the maximum impact so that its cleansing effect is greatly enhanced beyond the falling of the water under its own gravity after the force imparted to it by the blade has been exhausted.

In Figures 1 and 2 the container 10 is shown with a plain cylindrical body. In Figure 5 I have shown a vertically corrugated body 10$^a$ and a similarly corrugated cover 25$^a$ thereon to give increased strength and to serve the purpose of subdividing the upwardly flowing round film of water into definite paths, said top 25$^a$ presenting the described deflected under surface of the cover 25. The depressed central portion 25$^b$ of the cover 25 or 25$^a$ has a vent opening 29 therein over which is a fixed guard 30 which presents edge openings 31.

A drain pipe is provided leading from the depressed center of the bottom 19, a portion being conventionally indicated at 32, said pipe leading in practice to any sewer connection or otherwise as desired.

Reverting to the deflecting elements 28 their disposition and the deflecting surfaces presented thereby may vary to direct more or less of the water upwardly toward the tray 16 to be effective against the glasses, cups, etc. thereon.

I would state in conclusion that while the illustrated examples constitute practical embodiments of my invention, I do not limit myself strictly to the mechanical details herein illustrated since manifestly the same can be considerably varied without departure from the spirit of the invention as defined in the appended claims.

Having thus described my invention, I claim:—

1. A machine of the class described including a container adapted to receive the articles to be washed, driven means disposed in the said container at the bottom and adapted to direct water against the sides of the container for movement upwardly along said sides, means at the top of the container presenting surfaces to deflect the upflowing water from the sides of the body laterally inward and additional spaced deflecting means below said first-mentioned deflecting means.

2. A machine of the class described including a container adapted to receive the articles to be washed, driven means disposed in the said container at the bottom and adapted to direct water against the sides of the container for movement upwardly along said sides, and means at the top of said container presenting a surface to deflect the upwardly moving water laterally inward and positively deflect the laterally moving water downwardly to direct it on to the article in the receiver with the maximum impact.

3. A machine of the class described including a container adapted to receive the articles to be washed, driven means disposed in the said container at the bottom and adapted to direct water against the sides of the container for movement upwardly along said sides, and a cover on said container presenting a surface curving upwardly and inwardly to deflect the water laterally inward, and presenting a downward curve near the center continuous with the inward curve.

4. A machine of the class described including a container adapted to hold water, driven means disposed in the said container at the bottom and adapted to direct water against the sides of the container for movement upwardly along said sides, a basket in said container to hold the articles to be washed and deflecting means on said container at the interior below the top of said basket and positioned to direct the upflowing water laterally through the sides of the basket below the top thereof.

5. A machine of the class described including a container, a basket therein affording support near the bottom thereof for articles to be washed and affording support near the top for additional articles to be washed, revoluble means in the container beneath the basket adapted to force water against the sides of the container causing it to move upwardly along said sides, deflecting means below the upper support and above the lower support for directing water laterally inward into the basket between said supports, and means above the top of the basket to deflect the water from the sides of the container laterally inward and downward to the basket.

6. A machine of the class described including a container, a basket therein affording support near the bottom thereof for articles to be washed and affording support near the top for additional articles to be washed, revoluble means in the container beneath the basket adapted to force water against the sides of the container causing it to move upwardly along said sides, means above the top of the basket to deflect the water from the sides of the container laterally inward and downward to the basket, and additional deflecting means spaced from one another and located below the top of the basket for directing water laterally inward and upward.

7. A machine of the class described including a container, means therein at the bottom to force water against the sides of the container to cause the water to move upwardly along said sides, and a cover on said container curving over toward the center, the central portion of the cover being depressed on curved lines, there being a vent opening in the depressed portion and a guard over said opening and itself provided with an opening.

8. A machine of the class described including a container adapted to receive the articles to be washed, a water-agitating element in said container, said element having an agitating blade and a non-agitating balancing blade, said balancing blade tapering toward its forward edge.

9. A machine of the class described including a container adapted to receive articles to be washed, and a water-agitating element in said container, said element having an agitating blade at one side thereof, and a non-agitating balancing blade thereon at the opposite side of said element, said balancing blade being slightly curved transversely on its top surface, to have a tendency to be depressed as it is moved through the water.

10. In a machine of the class described adapted to receive articles to be washed, water-agitating means therein adapted to direct water against the sides of the container for movement upwardly along said sides, and a cover on said container, said cover presenting a deflecting surface to direct the water continuously inwardly and downwardly.

11. In a machine of the class described, a container adapted to receive articles to be washed, water-agitating means therein at the bottom adapted to direct water upwardly to said articles as well as toward the sides of the container, and means to deflect the water continuously inwardly and downwardly to the articles from the sides of the container.

ULYSSES S. G. WELSH.